(12) United States Patent
Moss

(10) Patent No.: US 6,463,484 B1
(45) Date of Patent: Oct. 8, 2002

(54) EGRESS PORT SCHEDULING USING MEMORY EFFICIENT REQUEST STORAGE

(75) Inventor: Barry G. Moss, Abbotsford (CA)

(73) Assignee: C-Sierra, Inc. (CA)

( * ) Notice: Subject to any disclaimer, the term of this patent is extended or adjusted under 35 U.S.C. 154(b) by 0 days.

(21) Appl. No.: 09/350,166

(22) Filed: Jul. 9, 1999

(51) Int. Cl.⁷ .............................................. G06F 13/14
(52) U.S. Cl. ........................... 710/36; 710/30; 710/29; 710/33; 709/232; 709/236
(58) Field of Search ................................ 709/200, 232, 709/236; 710/29, 30, 33, 36; 370/230, 248, 412, 413, 390, 392

(56) References Cited

U.S. PATENT DOCUMENTS 6,175,902 B1 * 1/2001 Runaldue et al. ........... 370/230
6,275,499 B1 * 8/2001 Wynn et al. ................ 370/438

OTHER PUBLICATIONS

IEEE P802.1p/D4: Draft Standard for Local and Metropolitan Area Networks—Supplement to Media Access Control (MAC) Bridges: Traffic Class Expediting and Dynamic Multicast Filtering, LAN MAN Standards Committee of the IEEE Computer Society, Sep. 6, 1996.

A Generalized Processor Sharing Approach to Flow Control in Integrated Services Networks: The Multiple Node Case; Abhay Parekh and Robert Gallager; IEEE/ACM Transactions on Networking, vol. 2, No. 2, Apr., 1994.

Analysis and Simulation of a Fair Queueing Algorithm; Alan Demers, Srinivasan Keshav, and Scott Shenker, Communications Architectures & Protocols: SIGCOMM 89 Symposium, Austin, Texas, Sep. 19–22, 1989.

Credit–Based Fair Queueing (CBFQ): A Simple and Feasible Scheduling Algorithm For Packet Networks; B. Bensaou, K.T. Chan, and D.H.K. Tsang; IEEE ATM Workshop Proceedings, Portugal, May 1997.

A Generalized Processor Sharing Approach to Flow Control in Integrated Sevices Networks: The Single–Node Case; Abhay Parekh and Robert Gallager; IEEE/ACM Transactions on Networking, vol. 1, No. 3, Jun. 1993.

* cited by examiner

Primary Examiner—Matthew Kim
Assistant Examiner—Pierre M. Vital
(74) Attorney, Agent, or Firm—Hall, Priddy, Myers & Vande Sande (57) ABSTRACT

The egress queue manager implements egress port scheduling using positional based storage in a memory array, which is more efficient then using FIFO or linked list approaches

21 Claims, 6 Drawing Sheets

EGRESS PORT SCHEDULING USING MEMORY EFFICIENT REQUEST STORAGE

FIELD

The invention relates generally to an egress port scheduler utilizing an array implementation which supports three scheduling modes.

BACKGROUND OF THE INVENTION

Communications technology is now utilizing digital technology to transmit and integrate voice, video, and data at high speeds over local area and wide area networks. This technology offers a flexible and efficient service, but such high speed networks tend to be susceptible to congestion. Severe congestion can result in data loss which exceeds an acceptable level. However, effective scheduling can prevent congestion from occurring thus maintaining the reliability of the network at high speeds.

Existing schedulers tend to fall into one of two classes:
queue or event based schedulers; and
calendar based schedulers.

The queue or event based scheduler places the service requests into one or more queues. The queue would usually take the form of a first-in-first-out (FIFO) memory or linked list. An event based scheduler requires n queues, where n is the number of priority levels or classes of service. The scheduler determines which queue should be serviced next then picks the next available request from the selected queue. These storage techniques can consume relatively large amounts of memory since the full address of the service requester would need to be stored within the data structure. Furthermore, while requests can be sorted into different queues, once the request is in the queue, the requests must be serviced in the order which they were received, even if this allows one request source to dominate the scheduling activity for a significant period of time.

To alleviate the problem of starvation, where one request source dominates the scheduling activity to the detriment of the other sources, weighted fair queuing was introduced. The principles of weighted fair queuing are described in the papers "Analysis and Simulation of a Fair Queuing Algorithm" by Alan Deters, Sririvasan Keshav, and Scott Shenker (Internetworking: Research and Experience Vol. 1, pp3–26, 1990, John Wiley and Sons) and "A Generalized Processor Sharing Approach to Flow Control in Integrated Service Networks: The Single Node Case" by Abhay Parekh and Robert Gallager (IEEE/ACY Transactions on Networking, Vol. 2, No. 2, April 1994). The weighted fair queuing system is based on the principle of assigning a timestamp to each incoming packet with respect to a local virtual clock. Packets with a lower timestamp would be processed at a higher priority. This system requires significant mathematical calculations and utilizes FIFO data structures to queue all incoming packet requests.

Subsequently, a more refined and more easily implemented fair queuing system was developed. In their paper "Credit Based Fair Queuing (CBFQ) A simple and feasible scheduling algorithm for packet networks" (B. Bensaou, K. T. Chan, and D. H. K. Tsang; IEEE ATK Workshop Proceedings, Portugal; May 1997) Bensaou, Chan and Tsang introduced a credit based fair queuing system which assigns a number of credits to each tragic source using a leaky bucket approach. However, this system sill requires significant mathematical calculations and utilizes FIFO data structures to queue all incoming packer requests. Furthermore, queue/event based scheduling requires significant amounts of memory to maintain the queues.

Calendar based schedulers insert service requests into lists which are scanned on a periodic basis. While this technique allows events to be scheduled in something other than a first-in-first-out fashion, traversing the list to determine where a new event should be scheduled is time consuming. Furthermore, as in queue/event based scheduling, the lists tend to require significant amounts of memory.

Conventional strict priority traffic schedulers always service the highest priority request first. During periods of high traffic and congestion, starvation of the lower priority requests exists. Also, the conventional leaky bucket type schedulers, although they are able to allocate traffic bandwidth resources between classes of service, bandwidth will often be wasted due to inactivity of a particular class to which the bandwidth has been allocated.

Accordingly, it is an object of the invention to provide an improved method and apparatus for scheduling service requests.

It is a further object of the invention to provide a storage mechanism that is more efficient than a FIFO data structure or a linked list.

SUMMARY OF THE INVENTION

These and other objects of the invention are provided in a new and improved egress port manager having a queue allocate and data block processor, transmit pending arrays and a queue fetch scheduler. The egress port manager accepts service requests from upstream data sources. Each service request contains a destination channel ID, a source channel ID and a priority field. The service requests are stored by the queue allocate and data block processor by setting a bit in a transmit pending array. The transmit pending array consists of a plurality of priority vectors, each having a plurality of multi-bit lines. The position of a set bit in the transmit pending array indicates the port that is requesting service and the priority or class of service of the particular service request.

The egress port manager supports three scheduling algorithms, Strict Priority Scheduling, Weighted Fair Scheduling and Weighted Priority Scheduling. The queue fetch scheduler of the egress port manager implements the scanning, scheduling and frame processing mechanisms. During operation, the vector to be searched is chosen pursuant to the scheduling algorithm that is employed. Once a vector is chosen, the vector is searched one line at a time. Each line of the vector is retrieved and searched using a multi-bit priority encoder. If a set bit is found, the scanner stops, sends a Queue Fetch message and waits for a Data Block to be returned. If the End Of Frame flag is not set in the Data Block header, the scanner sends another Queue Fetch message. If the End Of Frame fag is set, the queue allocate and data block processor clears the corresponding set bit and the scanner returns to searching the transmit pending array.

The progression of the search after a set bit has been found and the frame processed, is determined by the selected scheduling mode. Using Strict Priority Scheduling after processing a frame, the search is restarted within the vector having Priority 0 (the highest priority) and progresses to lower priority vectors only if the higher priority vector is vacant. In his tanner, the highest priority requests are always processed before lower priority requests.

If the Weighted Fair Scheduling mode is implemented on the egress port manager, a credit store is maintained for each priority level. One credit is deducted from the credit store of a particular priority level for each Queue Fetch command sent from that level. When all the vectors have been processed, additional credits are added to all the credit stores. A vector is considered to have been processed if either the credits in the vectors' store are insufficient to process a maximum sized frame or no bits are set in the vector. The amount of credits added is programmable for each priority level thus determining the weighting for each priority level of traffic. A second set of programmable values sets the maximum number of credits which can accumulate for each priority level. After a set bit has been found and the waiting frame has been processed, the search will continue within the current vector if sufficient credits to process a maximum sized frame remain; otherwise the search continues with the next vector which has sufficient credits to process a maximum sized frame.

If the Weighted Priority Scheduling mode is implemented on the egress port manager, it uses the same credit system as weighted Fair Scheduling. After processing a frame, the search does not continue within the present vector but continues with the highest priority vector with sufficient credits to process a maximum sized frame.

Other objects and advantages of the invention will become clear from the following detailed description of the preferred embodiment, which is presented by way of illustration only and without limiting the scope of the invention to the details thereof.

BRIEF DESCRIPTION OF THE DRAWINGS

Many objects and advantages of the present invention will be apparent to those of ordinary skill in the art when this specification is read in conjunction with the attached drawings wherein like reference numerals are applied to like elements and wherein.

DETAILED DESCRIPTION

Figure 1:
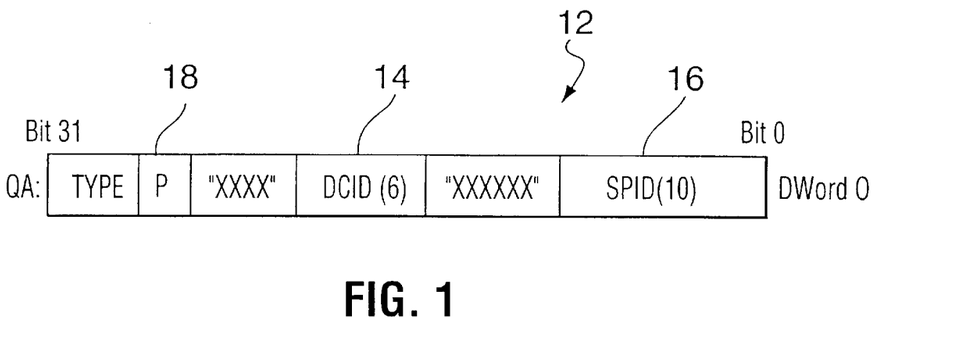
FIG. 1 is a diagrammatic representation of a Queue Allocate message.
Figure 2:
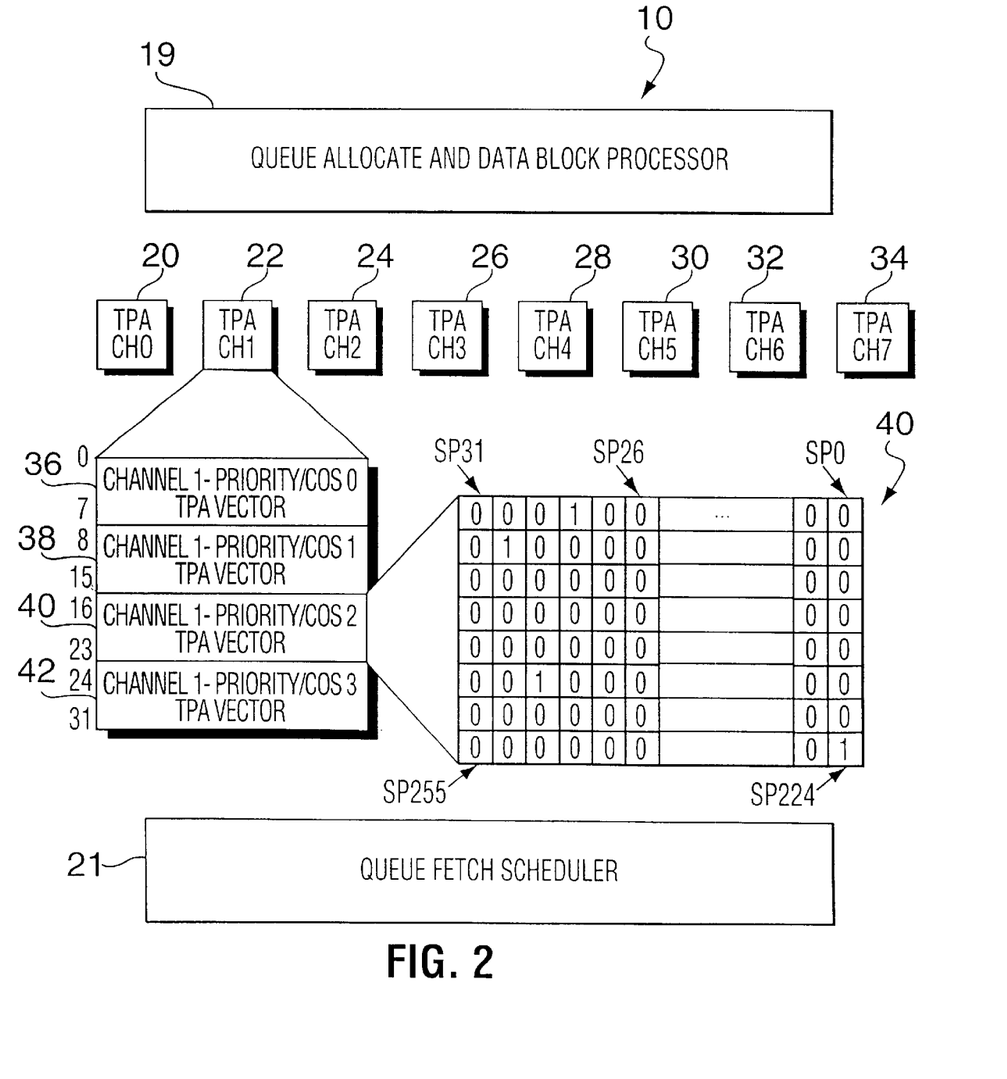
FIG. 2 is a diagrammatic representation of an Egress Port Manager, including a Transmit Pending Array.

Referring to FIGS. 1 and 2, the egress port manager 10, receives Queue Allocate messages 12 from upstream data sources. FIG. 1 depicts a typical queue allocate message 12 which contains a destination channel ID 14, a source port ID 16 and a priority field 18.

The egress port manager 10 contains a queue allocate and data block processor 19, a queue fetch scheduler 21 aid a plurality of channels and for each of the channels, the egress port manager 10 maintains a transmit pending array 20, 22, 24, 26, 28, 30, 32, 34. In the embodiment depicted in FIG. 2, the transmit pending arrays 20, 22, 24, 26, 28, 30, 32, and 34 support 4 priority levels and 256 ports each per channel. Each of the transmit pending arrays 20, 22, 24, 26, 28, 30, 32, and 34 is created having each priority level represented as a vector and within each vector eight 32-bit lines. Therefore, this embodiment of the transmit pending arrays 20, 22, 24, 26, 28, 30, 32, and 34 requires a total of 1024 bits per array which can be implemented as a 32×32 bit static random access memory for each of the arrays.

The queue allocate messages 12 accepted by the egress port manager 10 are stored in the respective transmit pending arrays 20, 22, 24, 26, 28, 30, 32, or 34 by setting a bit within the appropriate vector. The queue allocate and data block processor 19 is responsible for setting the correct bit in the appropriate transmit pending array. The position of the bit set within the transmit pending arrays 20, 22, 24, 26, 28, 30, 32, aid 34 indicates the source port and the priority of the queue allocate message 10 that is pending. For example, in FIG. 2, the transmit pending array of channel 1 has vectors 36, 38, 40 and 42 representing priority levels 0 to 3 respectively. Each of the vectors contains 256 bits with each bit representing a port. Therefore, within vector 40, the cell labeled SP224 has the bit set indicating that channel 1, source port 224 has a queue allocate message 12 of priority level 2 pending.

The egress port manager 10 supports three scheduling algorithms, Strict Priority Scheduling (SPS), Weighted Fair Scheduling (WFS) and Weighted Priority Scheduling (WPS). The scheduling algorithms, and the scanning and frame processing mechanisms are implemented on the queue fetch scheduler 21. The scheduling algorithms determine the order in which the vectors within the respective transmit pending arrays are searched. Furthermore, the mechanics of each particular scheduling algorithm, determines how the search progresses after a set bit has beer encountered and the associated pending frame has been processed. The details of the three scheduling algorithms will be discussed below.

Strict Priority Scheduler (SPS)

Figure 3:
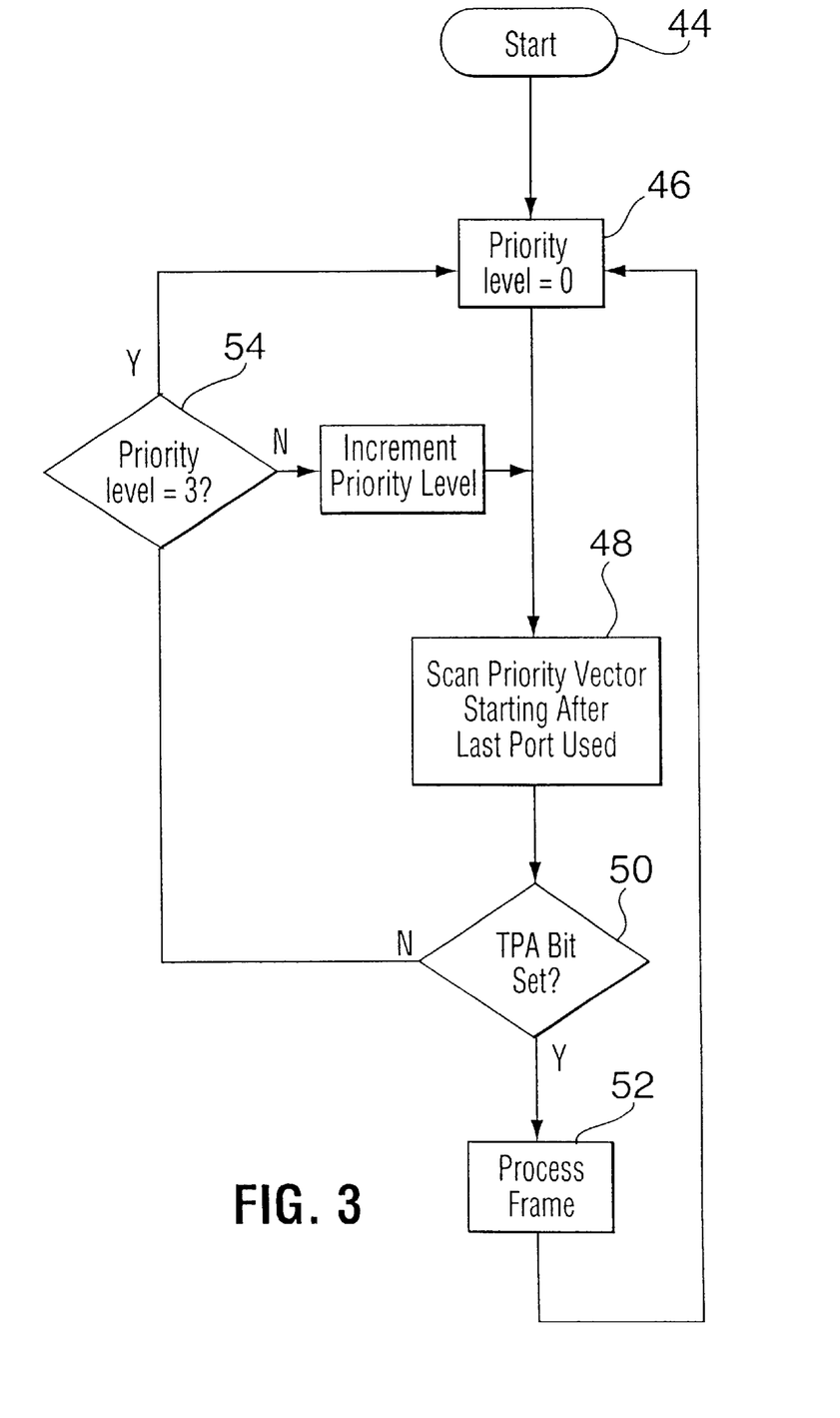
FIG. 3 is a decision tree which outlines the steps in the Strict Priority Scheduling Algorithm.
Figure 4:
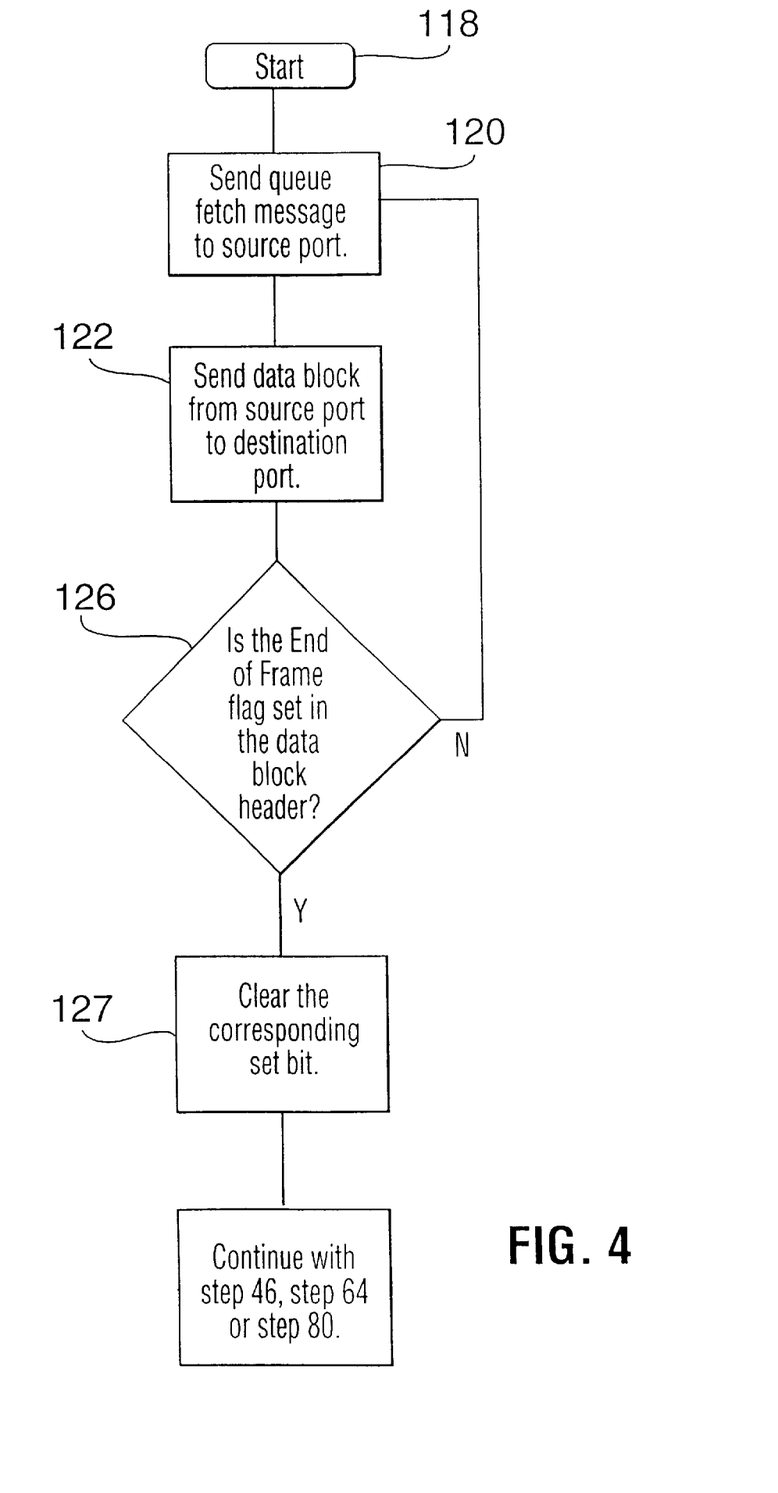
FIG. 4 is a decision tree which outlines the steps in the Process Frame step of the Strict Priority Scheduling Algorithm, Weighted Priority Scheduling Algorithm, and Weighted Fair Scheduling Algorithm.

Referring to FIG. 2 and 3, the SPS will be described with reference to the embodiment depicted in FIG. 2, especially the transmit pending array 22 of channel 1. For any of the transmit pending arrays 20, 22, 24, 26, 28, 30, 32, and 34 within the egress port manager 10, the SPS begins at step 44. At step 46, tile priority of the vector to be searched is initially set at the top priority vector 36. At step 48, the top priority vector 36 of the transmit pending array 22 is scanned one line at a time, retrieved using a pipeline operation, beginning after the index of the last source port which was serviced from this priority level. A bit mask is used to mask out all the port bits less than or equal to the last port index searched. If none of the unmasked bits in the vector are set, The search continues through the other lines of the vector, wrapping around the end of the vector until a line with a set bit is found. At step 50, a priority encoder is used to output the index of the least significant bit that is used within a retrieved line. If a set bit is found in a retrieved line of the vector, it indicates that frame transmission requests are pending. If there is more than one set bit in a vector, then the requests are processed in source port order from the last port serviced. At step 52, the frame is processed. Referring to FIG. 4, step 52 includes step 118, initiating the frame process. At step 120, a queue fetch message is sent to source port indicated by the set bit. At step 122, the source port sends the data block to the destination port. At step 126, the End of Frame (EOF) flag of the data block header is checked. If the EOF flag is not set then the process returns to step 120. If the EOF flag is set then the process moves to step 127. At step 127 the queue allocate and data block processor 19 clears the corresponding set bit. The process now returns goes to step 128, and from there proceeds to step 46. At this point, if there were any additional set bits in the vector, the requests represented by those bits are processed until all requests have been exhausted. At this point the process moves to step 54 and the vector for the next lowest priority is scanned. If there are no set bits in this vector indicating that there are no transmit requests pending for this priority level, the SPS will proceed to the next lowest priority level 56 and repeat the scanning process. If, at step 50, there are transmit requests pending for this priority, the first request, in source port order, is processed at step 52 and then algorithm returns to step 46 where the priority level is reset to the top priority.

Utilizing this algorithm ensures that the highest priority requests are always handled before lower priority requests and lower priority requests are handled only when all the higher priority requests have been exhausted.

Weighted Priority Scheduler (WPS)

The weighted priority scheduling mechanism provides the ability to distribute source data traffic over 4 weighted classes of service and prevent starvation of lower priority levels, while still maintaining a priority hierarchy.

Figure 5:
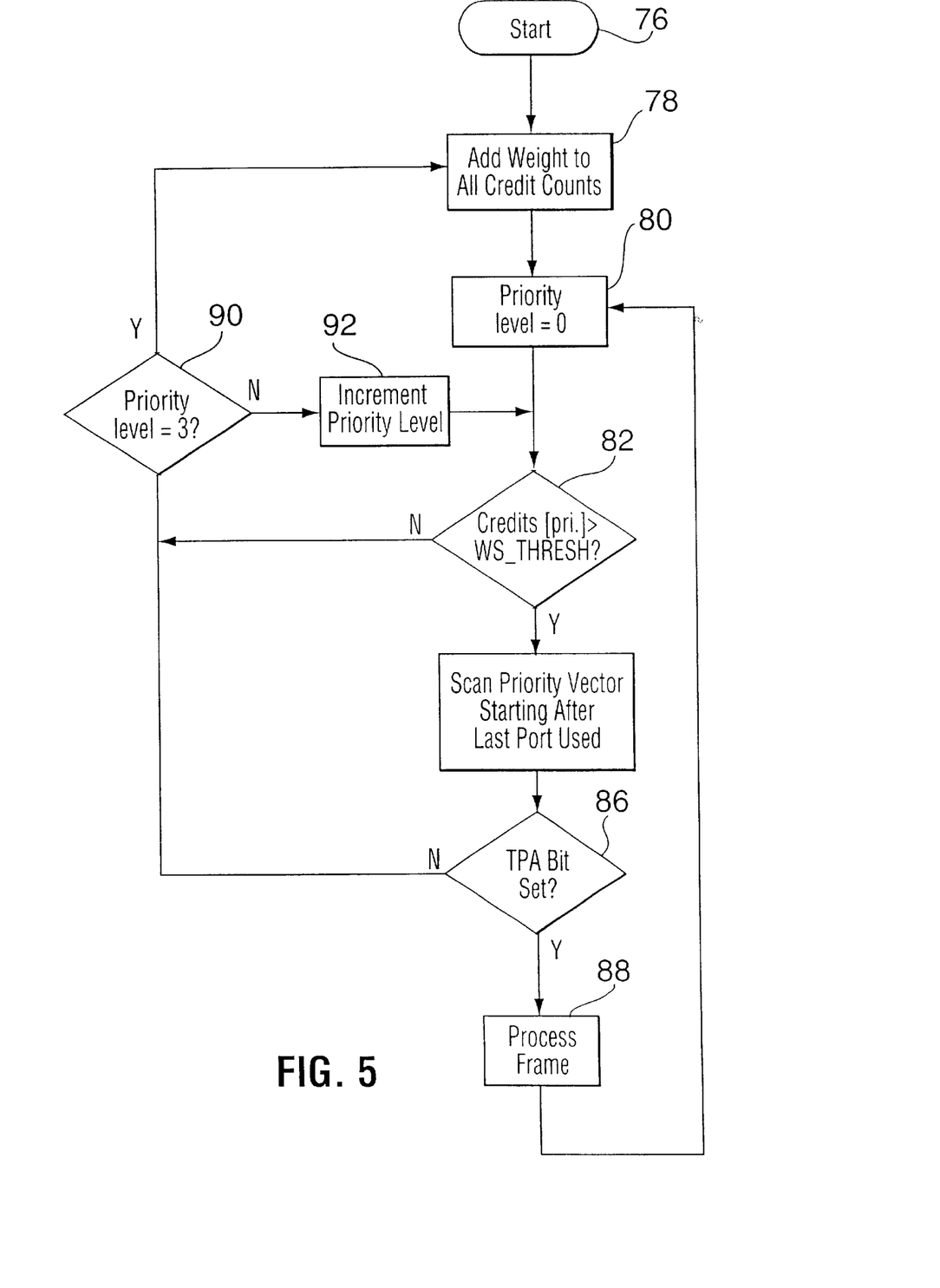
FIG. 5 is a decision tree which outlines the steps in the Weighted Priority Scheduling Algorithm.

Weighted priority scheduling is implemented using a credit accumulation scheme and weighted priority servicing, requiring a total of three storage registers (weighting, credit store and credit limit) per priority level and one adder/subtracter per channel. Referring to FIGS. 2 and 5, for any of the transmit pending arrays 20, 22, 24, 26, 28, 30, 32, and 34 within the egress port manager 10, the WPS begins at step 76. At step 78, the WPS adds the weighting value to the respective data block credit store for all priority levels. At step 80, the priority level is initially set to 0, the top priority. At step 82, the credit store of the current priority level is compared to the threshold level (WS_THRESH) representing the number of credits necessary to transmit a maximum sized frame. If sufficient credits are available for the highest priority level vector to transmit a maximum sized frame (i.e. the credit store is >=WS_THRESH) the vector is scanned at step 84 one line at a time, retrieved using a pipeline operation, beginning after the index of the last source port which was serviced from this priority level. A bit mask is used to mask out all the port hits less than or equal to the last port index searched. If none of the unmasked bits in the vector are set, the search continues through the other lines of the vector, wrapping around the end of the vector until a line with a set bit is found. At step 86, a priority encoder is used to output the index of the least significant bit that is set within a retrieved line. If a set bit is found in a retrieved line of the vector, it indicates that frame transmission requests are pending. If there is more than one set bit in a vector, then the requests are processed in source port order from the last port serviced. At step 88, the frame is processed. Referring to FIG. 4, step 88 includes step 118, initiating the frame process. At step 120, a queue fetch message is sent to source port indicated by the set bit. At step 122, the source port sends the data block to the destination port. At step 126, the End of Frame (EOF) flag of the data block header is checked. If the EOF flag is not set then the process returns to step 120. If the EOF flag is set then the process moves to step 127. At step 127, the queue allocate and data block processor 19 clears the corresponding set bit. The process now goes to step 128, and from there proceeds to step 80. At step 80, the priority level is again reset to the highest priority. At step 82, the credit store is again checked. Additional frame requests at the top priority level are processed as long as the credit store remains above the threshold level. If the credit store has fallen below the threshold level or all of the top priority transmit requests have been exhausted the process moves to step 90. At step 90, if the priority is not currently set at the lowest priority then at step 92, the priority is incremented by one. The algorithm returns to step 82 where the credit store for the next lowest priority level is checked and if its credit store is above the threshold level, the vector is scanned at step 84 and pending frames will be processed if there are insufficient credits available or there are no transmit requests pending for this priority level, the scheduler will proceed to the next lowest priority level. If the algorithm reaches step 88 and a frame is processed at this priority level, the algorithm returns to step 80 where the priority is reset to the highest priority. If at step 90, the priority has reached the lowest level, the algorithm returns to step 78 and the weights are again added to the credit stores and the priority level is reset to the highest priority.

Note that if the limit value is set to the weight value, the scheduler will be memoryless and will allocate the same share of scheduling requests each time through the loop as specified by the weighting values. However, if the limit value is larger than the weight value, then that given priority level may store its unused bandwidth up to the credit limit and the weight values become time averaged weightings. A limit value lower than the weight value is an illegal condition since the limit value would effectively.

When all priority levels have either a credit store value below the threshold level or no transmission requests pending, the scheduler again updates the credit stores for all priority levels by adding the weighting value to the value remaining in the data block credit store. The credit store registers saturate at the limit value. The scheduler then begins again at he highest priority level.

Weighted Fair Scheduler (WFS)

The WFS mechanism provides the ability to distribute source data traffic over n weighted classes of service.

Figure 6:
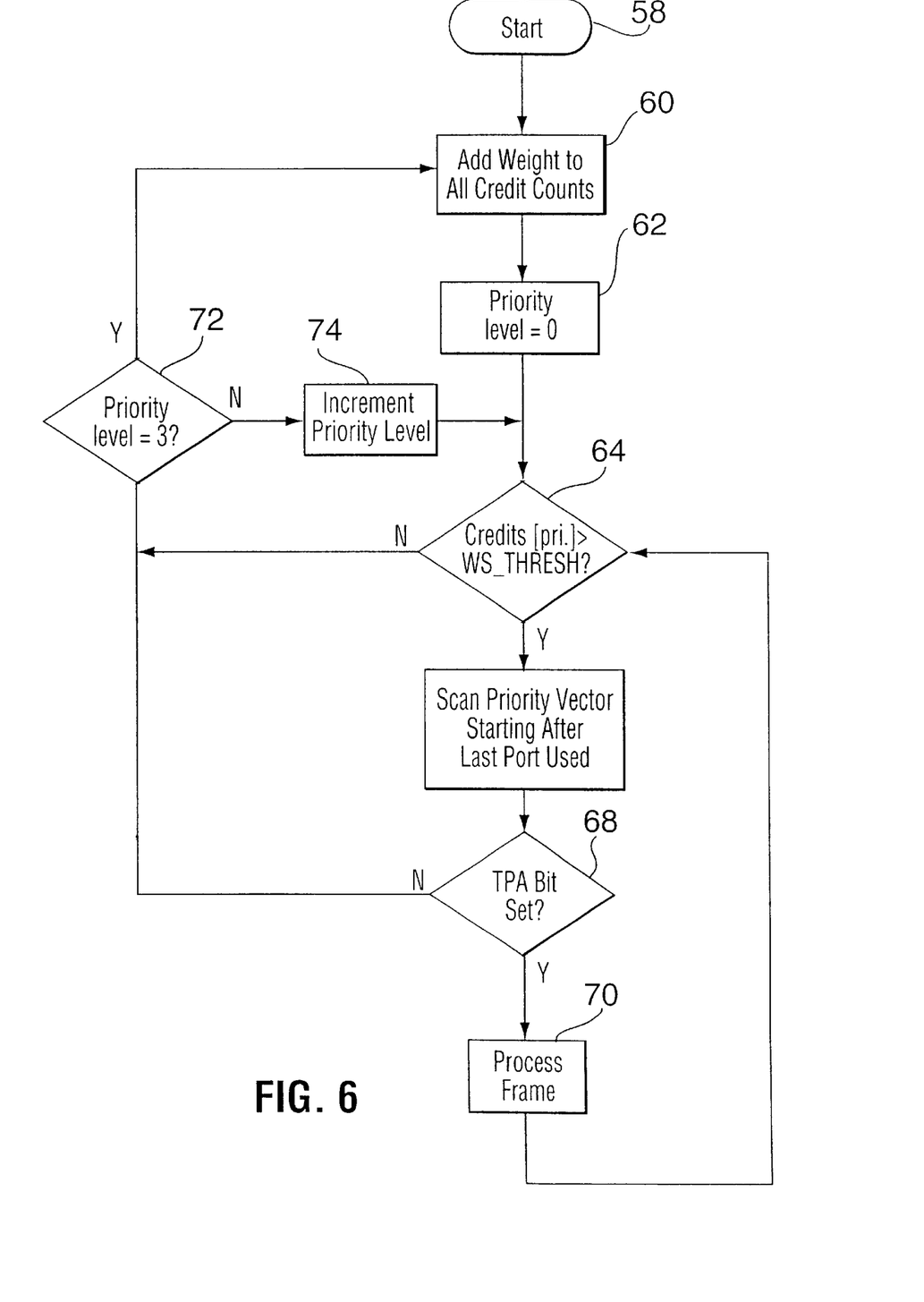
FIG. 6 is a decision tree which outlines the steps in the Weighted Fair Scheduling Algorithm.

The WFS mechanism is implemented using a credit accumulation scheme and weighted round-robin servicing, requiring a total of three storage registers (weighting, credit store and credit limit) per priority level and one adder/subtracter per channel. Referring to FIGS. 2 and 6, for any of the transmit pending arrays 20, 22, 24, 26, 28, 30, 32, and 34 within the egress port manager 10, the WFS begins at step 58. At step 60, the WFS adds the weighting value to the respective data block credit store for all priority levels. At step 62, the priority level is initially set to 0, the top priority. At step 64, the credit store of the current priority level is compared to the threshold level representing the number of credits necessary to transmit a maximum sized frame. If sufficient credits are available for the highest priority level vector to transmit a maximum sized frame (i.e. the credit store is >=WS_THRESH) the vector is scanned at step 66 one line at a time, retrieved using a pipeline operation, beginning after the index of the last source pore which was serviced from this priority level. A bit mask is used to mask out all the port bits less than or equal to the last port index searched. If none of the unmasked bits in the vector are set, the search continues through the other lines of the vector, wrapping around the end of the vector until a line with a set bit is found. At step 68, a priority encoder is used to output the index of the least significant bit that is set within a retrieved line. If a set bit is found in a retrieved line of the vector, it indicates that frame transmission requests are pending. If there is more than one set bit in a vector, then the requests are processed in source port order from the last port serviced. At step 70, the frame is processed. Referring to FIG. 6, step 70 includes step 118, initiating the frame process. At step 120, a queue fetch message is sent to source port indicated by the set bit. At step 122, the source port sends the data block to the destination port. At step 126, the End of Frame (EOF) flag of the data block header is checked. If the EOF flag is rot set then the process returns to step 120. If the EOF flag is set then the process moves to step 127. At step 127, the queue allocate and data block processor 19 clears the corresponding set bit. The process now goes step 128, and from there proceeds to step 64.

At step 64, the credit store is again checked. Additional frame requests at the top priority level are processed as long as the credit store remains above the threshold level. If the credit store has fallen below the threshold level or all of the top priority transmit requests have been exhausted the process moves to step 72. At step 72, if the priority is not currently set at the lowest priority then at step 74, the priority is incremented by one. The algorithm return to step 64 where the credit store for the next lowest priority level is checked and if its credit store is above the threshold level, the vector is scanned and pending frames will be processed. If there are insufficient credits available or there are no transmit requests pending for this priority level, the scheduler will proceed to the next lowest priority level. If at step 72, the priority has reached the lowest level, the algorithm returns to step 60 and the weights are again added to the credit stores and the priority level is reset to the top priority.

Note that if the limit value is set to the weight value, the scheduler will be memoryless and will allocate the same share of scheduling requests each time through the loop as specified by the weighting values. However, if the limit is larger than the weight value, then bursting is allowed for that given class of service and the weight values become time averaged weightings. (A limit value lower than the weight value is an illegal condition since the limit value would effectively become the weighting value.)

The weighted fair scheduling is a completely fair system which does not assign any priority to a particular class of service and simply acts as a means of sharing the available bandwidth for a channel between different classes of service without wasting unused bandwith the way traffic shapers or bandwidth reservation systems may.

Figure 7:
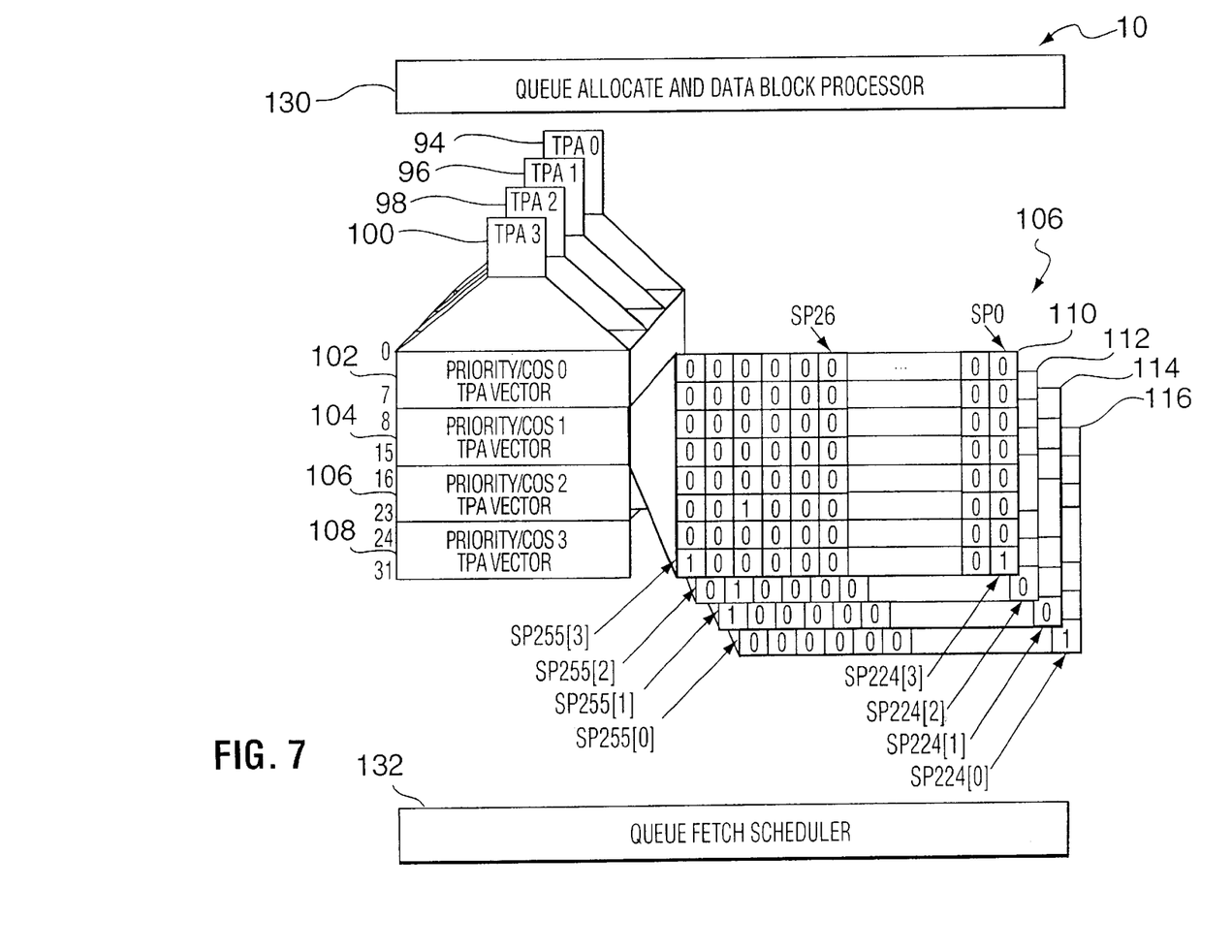
FIG. 7 is a diagrammatic representation of a Multi-bit Transmit Pending Array.

Referring to FIG. 7, an alternate embodiment of the egress port manager 10 utilizes a multi-bit transmit pending array to allow for more than one outstanding request per source/priority pair. The egress port manager with a single bit multi-bit transmit pending array is arranged similarly to the egress port manager with a transmit pending array having a queue allocate and data block processor 130, a queue fetch scheduler 132 and a plurality of channels with corresponding multi-bit transmit pending arrays 94, 96, 98 and 100. Also, the multi-bit transmit pending array may have multiple vectors. For example, The multi-bit transmit pending array 100 has vectors 102, 104, 106 and 08 representing priority levels 0 to 3, respectively. This implementation will require m=integer($\log_2(n+1)$) bits for each vector position, where n is the maximum number of requests which can be outstanding. The implementation depicted in FIG. 7, uses 4 bits (arrays 110, 112, 114, and 116) for up to 15 outstanding requests. The vectors are created m bits deep; in this implementation, four 32×32 RAMs can be used for the multi-bit transmit pending array. Ram 0 contains bit 0 for each vector value, Ram 1 contains bit 1 of each vector value, and so on.

When a queue allocate message is received, the m-bit for the source port in the given priority vector is incremented. When a vector location is serviced and the final Data Block for the frame is received, the m-bit value is decremented. The search now searches for a non-zero value in a vector, rather than a single set bit. The m 32-bit lines are logically bit-wise ORed together and the resulting 32-bit word is searched as in the single bit implementation.

When a non-zero value is found in a vector, the scanner notifies a secondary queue fetch request processor which handles multiple outstanding Queue retch requests for up to 10 queues. If the request is accepted as valid, the scanner picks the next vector to process according to the scheduling algorithm. If the request is rejected, the port is masked and the current line is reprocessed.

In still another embodiment of the egress port manager, a register based implementation is used as opposed to RAM based implementation. Instead of using RAM to store the transmit pending array, D-type registers could be used. The size of the transmit pending array and the specifics of the semiconductor technology used would dictate whether a RAM or registers would be more economical. Alternatively, each vector could be arranged as a single row and searched using a priority encoder the width of the entire vector. This would speed up the searching process.

The above-described embodiments should be regarded as illustrative rather than restrictive, and it should be appreciated that variations may be made other than those discussed, by workers of ordinary skill in the art without departing from the scope of the present invention as defined by the following claims.

What is claimed is:

1. An apparatus for managing egress ports which accepts service requests sent from source ports with pending frames, comprising:

a) an array having x rows and y columns, wherein the position of a set bit within said array corresponds to a priority and a source port of said service requests, and x and y are integers greater than or equal to one;

b) a queue/data processor capable of setting said set bit in said array and clearing said set bit in said array;

c) a scanner wherein said scanner searches said array for said set bit;

d) a scheduler for determining the mechanism by which said scanner searches said array; and e) a frame processor for transferring said pending frames from said source port to a destination port.

2. The apparatus according to claim 1, wherein said array is a random access memory array.

3. The apparatus according to claim 1, wherein said array is a register type memory array.

4. The apparatus according to claim 1, wherein said scanner is a pipeline operation reads an entire row of said array.

5. The apparatus according to claim 1, wherein said scheduler is a strict priority scheduler.

6. The apparatus according to claim 1, wherein said scheduler is a weighted priority scheduler and said apparatus further includes a weighting register, a credit store register and a credit limit register.

7. The apparatus according to claim 1, wherein said scheduler is a weighted Fair scheduler and said apparatus further includes a weighting register, a credit store register and a credit limit register.

8. An apparatus for managing egress ports which accepts service requests sent from source ports with pending frames, comprising:

a) an array having x rows, y columns and z layers, wherein the position of a set bit within said array corresponds to a priority and a source port of said service requests, and the number of said service requests accepted from said source ports and x, y and z are integers greater than or equal to one;

b) a queue/data processor capable of setting said set bit in said array and clearing said set bit in said array;

c) a scanner wherein said scanner searches said array for said set bit;

d) a scheduler for determining the mechanism by which said scanner searches said array; and e) a frame processor for transferring said pending frames from said source port to a destination port.

9. The apparatus according claim 8, wherein said array is a random access memory array.

10. The apparatus according to claim 8, wherein said array is a register type memory array.

11. The apparatus according to claim 8, wherein said scanner is a pipeline operation which reads an entire row of said array.

12. The apparatus according to claim 8, wherein said scheduler is a strict priority scheduler.

13. The apparatus according to claim 8, wherein said scheduler is a weighted priority scheduler and said apparatus further includes a weighting register, a credit store register and a credit limit register.

14. The apparatus according to claim 8, wherein said scheduler is a weighted fair scheduler, and said apparatus further includes a weighing register, a credit store register and accredit limit register.

15. A method of managing egress ports which accepts service requests sent from source ports with pending frames, comprising:

a) setting a bit in an array having x rows and y columns, wherein the position of said set bit corresponds to the priority of an associated one of said service requests and a source port sending said one service request and x and y are integers greater than or equal to 1;

b) scanning said array for set bits according to a scheduling algorithm;

c) transferring a frame from said source port to a destination port when one of said set bits is found;

d) clearing said found set bit;

e) repeating steps a) to d) according to said scheduling algorithm.

16. The method according to claim 15, wherein said array is a random access memory array.

17. The method according to claim 15, wherein said array is a register type memory array.

18. The method according to claim 15, wherein said scanning step includes a pipeline operation which reads an entire one of said rows of said array.

19. The method according to claim 15, wherein said scheduling algorithm is a strict priority scheduler.

20. The method according to claim 15, wherein said scheduling algorithm is a weighted priority scheduler and said apparatus further includes a weighting register, a credit store register and a credit limit register.

21. The method according to claim 15, wherein said scheduling algorithm is a weighted fair scheduler and said apparatus further includes a weighting register, a credit store register and a credit limit register.

* * * * *

UNITED STATES PATENT AND TRADEMARK OFFICE
CERTIFICATE OF CORRECTION

PATENT NO. : 6,463,484 B1
DATED : October 8, 2002
INVENTOR(S) : Barry G. Moss

It is certified that error appears in the above-identified patent and that said Letters Patent is hereby corrected as shown below:

Title page,
Item [73], after Assignee, delete "C-Sierra", and insert -- PMC-Sierra --.

Column 1,
Line 47, delete "IEEE/ACY", and insert -- IEEE/ACM --.
Line 57, after "(CBFQ)", insert -- : --.
Line 59, delete "ATK", and insert -- ATM --.
Line 62, delete "tragic", and insert -- traffic --.
Line 65, delete "packer", and insert -- packet --.

Column 2,
Line 52, delete "fag", and insert -- flag --.
Line 62, delete "his tanner", and insert -- this manner --.

Column 3,
Line 18, delete "weighted", and insert -- Weighted --.
Line 61, delete "aid", and insert -- and --.

Column 4,
Line 41, delete "tile", and insert -- the --.
Line 49, delete "The", and insert -- the --.
Line 52, delete "used", and insert -- set --.
Line 65, delete "127", second instance, insert -- , --.
Line 67, delete "returns".

Column 5,
Line 41, delete "hits", and insert -- bits --.

Column 6,
Line 7, delete "processed if", and insert -- processed. If --.
Line 25, after "effectively", delete ".", and insert -- become the weighting value --.
Line 32, delete "he", and insert -- the --.
Line 53, delete "pore", and insert -- port --.

Column 7,
Line 4, delete "rot", and insert -- not --.
Line 44, delete "single bit".
Line 46, after "with a", and insert -- single bit --.
Line 52, delete "08", and insert -- 108 --.

UNITED STATES PATENT AND TRADEMARK OFFICE
CERTIFICATE OF CORRECTION

PATENT NO. : 6,463,484 B1
DATED : October 8, 2002
INVENTOR(S) : Barry G. Moss

It is certified that error appears in the above-identified patent and that said Letters Patent is hereby corrected as shown below:

Column 8,
Line 6, delete "retch", and insert -- Fetch --.
Line 49, after "operation", insert -- which --.
Line 58, delete "Fair", and insert -- fair --.

Column 9,
Line 28, delete "accredit", and insert -- a credit --.

Signed and Sealed this

Fifteenth Day of July, 2003

JAMES E. ROGAN
*Director of the United States Patent and Trademark Office*